(No Model.)
H. H. WING.
PROCESS OF MANUFACTURING GRAPHITE.
No. 598,549. Patented Feb. 8, 1898.
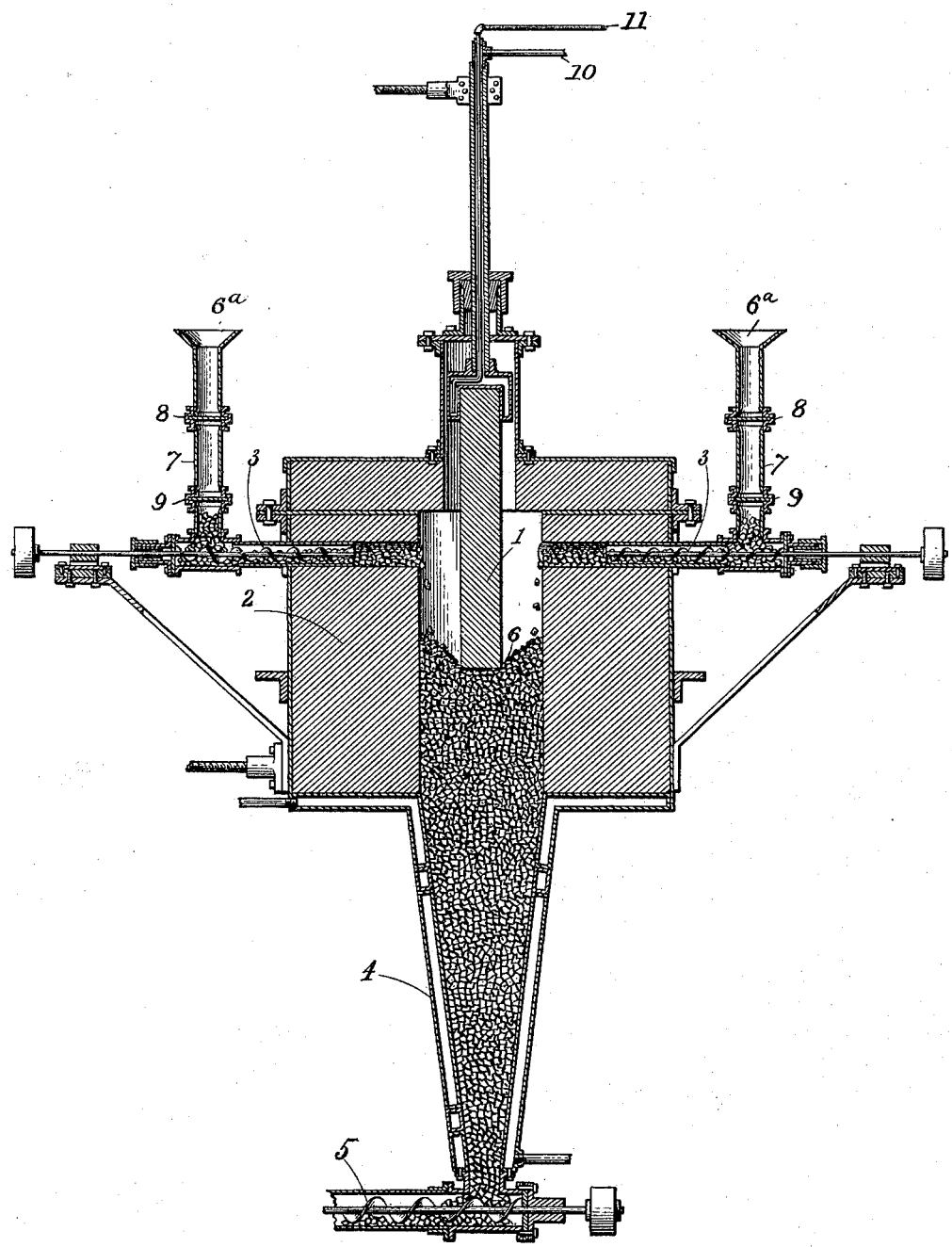
Witnesses:
L. M. Spong.
A. J. Sangster.
Herbert H. Wing  Inventor
By  James Sangster
Attorney.

UNITED STATES PATENT OFFICE.

HERBERT H. WING, OF BUFFALO, NEW YORK.

PROCESS OF MANUFACTURING GRAPHITE.

SPECIFICATION forming part of Letters Patent No. 598,549, dated February 8, 1898.

Application filed December 14, 1896. Serial No. 615,685. (No specimens.)

*To all whom it may concern:*

Be it known that I, HERBERT H. WING, a citizen of the United States, residing at Buffalo, in the county of Erie and State of New York, have invented certain new and useful Improvements in the Manufacture of Graphite, of which the following is a specification.

The object of my invention is to produce graphite in an economical, rapid, and commercial manner.

In order to accomplish my object, I submit material containing carbon to the high degree of heat which is only obtained commercially at present in the electric furnace, and I have found that the degree of heat and the time that the material is subjected to such intense heat determine the amount of graphite produced. These two factors determine the quantity of graphite obtained from a definite weight of amorphous carbon. My process is therefore a direct method of obtaining commercially graphite from amorphous carbon without requiring the formation of carbids and decomposition of the same, by which the more easily volatile mineral elements are volatilized, leaving the carbon in a graphitic form.

To obtain graphite commercially, I proceed as follows:

I prefer to use as the raw material some form of coke in which the hydrocarbons have been previously expelled. I then bring this material into a granular or coarsely-powdered condition and feed the same continuously into an electric furnace, such as is shown in the accompanying drawing, in which—

1 represents a carbon electrode, 2 the carbon lining to the furnace, and 3 two horizontal conveyers.

4 is a water-jacketed receiving-hopper, and 5 is a conveyer situated to control the continuous discharge of the graphite which has been cooled by the water-jacket.

6 shows the material and the height in the furnace that the material is maintained.

I arrange to have the feed and discharge both continuous and constant, so that this is an automatic process.

In order to maintain a continuous feed of material and at the same time secure an airtight furnace, the material is fed into hoppers $6^a$, which discharge into upright pipes 7, in which are located two valves 8 and 9. Material is fed into the top part of said upright pipes 7, the valves 8 being closed. When these pipes are filled, the valves 8 are opened, allowing the material to fill the space between the valves 8 and 9. Then the valves 8 are closed and the valves 9 opened and kept so until all the material above them is fed into the furnace by means of the screw conveyers, which working at a continuous speed make the amount of material fed into the furnace uniform. The valves 9 are then closed and the operation repeated.

The screw conveyers project into the furnace-lining only part way. This arrangement prevents the heat of the furnace from injuring the conveyer and also serves to prevent the gases from finding an exit this way.

The carbon electrode is supported by a metal holder which is preferably made with a water or steam jacket, which serves to make a better contact, as it does not melt away by being exposed to the high heat of the furnace.

10 represents the overflow or exhaust steam pipe, and 11 represents the inflow-pipe for the steam or water.

I find that the temperature required to obtain a complete conversion of the carbon to graphite is just below the volatilization-point of the carbon, and in order to accomplish the economical production of the graphite the material is heated by the resistance it offers to the current, and by arranging the size of the inside of the furnace to the voltage and amperage of electric current I arrange the feed and discharge so that the material is brought up to the temperature which changes the carbon to graphite with the losses by volatilization of the graphite reduced to a minimum. This process differs from all previous electric smelting processes, and the result obtained of changed material is larger for the reason that the only heat consumed in this process, so far as at present ascertainable, is used in raising the material to the desired temperature with no absorptive of heat to perform chemical reductions. Furthermore, the graphite and carbon are cooled in the furnace without exposure to oxidizing agents, such as air, which would produce combustion and destroy more or less of the product.

In order to produce the largest amount of graphite by the use of an electric current of a certain number of watts, it is often found that there is some unconverted carbon in the discharged graphite product, and it is more economical to produce such a product and separate the graphite from the unconverted carbon by treating it with an active oxidizing agent which has the property of attacking the unconverted carbon, while the graphite resists such action and is thereby obtained in a pure condition. Thus, for instance, the product of the furnace is placed in a suitable vessel and subjected to the action of a chlorate and an acid—as, for instance, nitric or sulfuric acid, or both, which attacks the unconverted carbon before it acts upon the graphite. When this action has gone on for a sufficient time, the graphite is removed and washed or otherwise purified in the usual way.

I claim as my invention—

1. The herein-described process for the production of graphite, which consists in passing an electric current through granular or powdered carbonaceous material, whereby the heat thus produced converts part of said carbon into graphite, and then separating the unconverted carbon from the graphite.

2. The herein-described process for the continuous production of graphite, which consists in continuously feeding into an electric furnace carbonaceous material, whereby the resistance which it offers to the passage of the electric current produces sufficient heat to convert part of the carbon of the carbonaceous material into the graphite, then partially cooling said material, then removing it from said electric furnace, and then separating the unconverted carbon from the graphite.

HERBERT H. WING.

Witnesses:
JAMES SANGSTER,
L. M. SPONG.